United States Patent
Wieczorek et al.

(10) Patent No.: US 9,599,724 B2
(45) Date of Patent: Mar. 21, 2017

(54) GAMMA RADIATION DETECTION DEVICE

(71) Applicant: KONINKLIJKE PHILIPS N.V., Eindhoven (NL)

(72) Inventors: Herfried Karl Wieczorek, Aachen (DE); Cornelis Reinder Ronda, Aachen (DE); Jacobus Gerardus Boerekamp, Someren (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/888,595

(22) PCT Filed: Apr. 23, 2014

(86) PCT No.: PCT/EP2014/058213
§ 371 (c)(1),
(2) Date: Nov. 2, 2015

(87) PCT Pub. No.: WO2014/180658
PCT Pub. Date: Nov. 13, 2014

(65) Prior Publication Data
US 2016/0109587 A1    Apr. 21, 2016

(30) Foreign Application Priority Data
May 8, 2013    (EP) .................................... 13167043

(51) Int. Cl.
*G01T 1/20* (2006.01)
(52) U.S. Cl.
CPC .................................. *G01T 1/2018* (2013.01)

(58) Field of Classification Search
CPC ......... G01T 1/20; G01T 1/202; G01T 1/2018; C09K 11/7769; C09K 11/7787
See application file for complete search history.

(56) References Cited

U.S. PATENT DOCUMENTS

| 5,091,650 | A | 2/1992 | Uchida et al. |
| 6,369,390 | B1 | 4/2002 | Genna |
| 8,197,711 | B2 * | 6/2012 | Peuchert ............... C04B 35/486 250/361 R |
| 2004/0140431 | A1 | 7/2004 | Schmand et al. |
| 2004/0262526 | A1 | 12/2004 | Corbeil et al. |

(Continued)

FOREIGN PATENT DOCUMENTS

| EP | 0250983 | 1/1988 |
| JP | 01242687 A * | 9/1989 |

(Continued)

OTHER PUBLICATIONS

Handbook of Fluidization and Fluid Particle Systems, CRC Press 2003, Ed. Yang, Wen-Cheng, ISBN:0/8247-0259-X.

(Continued)

*Primary Examiner* — David Porta
*Assistant Examiner* — Faye Boosalis

(57) ABSTRACT

A gamma radiation detection device (1) includes a scintillator element (2) and an optical detector (3) in optical communication with the scintillator element (2). A plurality of particles or voids (5) are dispersed in the scintillator element (2) which scatter the scintillation light (7), reducing the trapping of scintillation light (7) by multiple reflections.

15 Claims, 5 Drawing Sheets

(56) References Cited

U.S. PATENT DOCUMENTS

| | | | |
|---|---|---|---|
| 2006/0054863 A1* | 3/2006 | Dai | B82Y 10/00 252/301.4 R |
| 2012/0292516 A1 | 11/2012 | Yasui et al. | |
| 2013/0009067 A1 | 1/2013 | Schmand et al. | |
| 2013/0026371 A1 | 1/2013 | Holloway et al. | |

FOREIGN PATENT DOCUMENTS

| | | |
|---|---|---|
| WO | 99/44078 | 9/1999 |
| WO | 2006/097876 | 9/2006 |
| WO | 2009/090580 | 7/2009 |
| WO | 2012133603 | 10/2012 |
| WO | 2012/153223 | 11/2012 |

OTHER PUBLICATIONS

Janecek, "Simulating Scintillator Light Collection using Measured Optical Reflectance" Jan. 28, 2010.

\* cited by examiner

GAMMA RADIATION DETECTION DEVICE

CROSS-REFERENCE TO PRIOR APPLICATIONS

This application is the U.S. National Phase application under 35 U.S.C. §371 of International Application No. PCT/EP2014/058213, filed on Apr. 23, 2014, which claims the benefit of European Patent Application No. 13167043.2, filed on May 8, 2013. These applications are hereby incorporated by reference herein.

FIELD OF THE INVENTION

The invention relates to a gamma radiation detection device. The invention finds general application in the field of medical imaging. More particularly the invention finds application in the fields of PET and in SPECT imaging and is described with particular reference thereto.

BACKGROUND OF THE INVENTION

In the fields of PET and SPECT imaging, a radiotracer is administered to a patient which is preferentially uptaken by particular regions of the body. The radiotracer causes the emission of gamma photons which are detected by the medical imaging system and used to generate images of the radiotracer's spatial distribution. Such images may subsequently be interpreted by a physician in order to investigate the functioning of biological processes. The quality of these images, particularly their signal to noise ratio, is desirably improved in order to assist in clinical diagnosis and is in part dependent upon the sensitivity with which gamma photons are detected.

The detection of gamma photons is carried out by a gamma camera in a SPECT imaging system. A gamma camera comprises one or more detector heads that are positioned to receive gamma photons from an imaging region. Each head comprises one or more gamma photon detectors. In contrast to SPECT, in a PET imaging system gamma photons are detected in pairs by modules of gamma photon detectors disposed radially about an imaging region. A gamma photon detector is therefore a common feature in both SPECT and PET imaging systems and is defined herein to comprise a scintillator element in optical communication with an optical detector. An optical detector is defined herein to comprise an optical sensor that receives optical radiation and generates an electrical signal in response to said optical radiation.

In a gamma photon detector a scintillator element creates a pulse of scintillation light when struck by a gamma photon. The associated optical detector subsequently converts the scintillation light into an electrical signal. In seeking to maximize their image quality, imaging systems desirably use sensitive gamma photon detectors which efficiently convert a received gamma photon's energy into an electrical pulse. Maximizing this efficiency therefore demands that the optical detector captures as much of the original scintillation light produced by the scintillator element as possible.

A further improvement is achieved in PET and SPECT imaging systems by improving the optical isolation between neighboring gamma photon detectors. Such imaging systems typically have a densely packed arrangement of gamma photon detectors in which light leakage between scintillator elements risks the misinterpretation of its source, thereby degrading their spatial resolution.

Known methods for improving the capture of scintillation light by the optical detector in a radiation detector include the wrapping of the scintillator element in for example PTFE tape. A small air gap between the PTFE tape and the surface of the high refractive index scintillator element acts to retain scintillation light within the scintillator element that is incident to its surfaces at oblique incidence angles using total internal reflection. The PTFE tape operates to return some of the scintillation light to the scintillator element whose incidence at near-normal incidence angles means that it is not otherwise retained by total internal reflection.

Another method disclosed in U.S. Pat. No. 5,091,650A involves the application of inwardly-reflecting layers to the surfaces of the scintillator element other than those in optical communication with the optical detector. These improve both the capture efficiency of scintillation light by the optical detector, and also the optical isolation between neighboring scintillator elements.

In document Simulating Scintillator Light Collection using Measured Optical Reflectance SCH-TNS-00249-2009.R1, Janecek et al discuss the need to accurately model the optical properties of reflecting layers applied to scintillator elements in predicting the light collection from a scintillating crystal and furthermore disclose models for reflecting layers such as Lumirror®, ESR film, Tyvek®, and TiO paint.

Patent application WO2012/153223 discloses to mitigate light trapping in a scintillator crystal by roughening at least one side of a plurality of pre-formed polished scintillator crystals, and further to apply a specular reflector material to the roughened crystals which are arranged in an array.

US patent U.S. Pat. No. 6,369,390B1 discloses a scintillation camera crystal having a plurality of light scattering holes in the crystal extending toward the photo-sensor and communicating with at least one surface of the crystal. The crystal is formed from a first material and the holes include a second material differing from the first material for deflecting the light generated by the scintillation crystal in response to incident gamma rays and reducing the spread of the generated light.

In the gamma photon detectors described above, whilst the use of inwardly-reflecting layers improves the capture efficiency of scintillation light by the optical detector, much of the scintillation light is still not captured by the associated optical detector. This degrades the gamma photon detector's signal to noise ratio and furthermore degrades the image quality of SPECT and PET imaging systems employing such detectors. Consequently a need exists to improve a gamma photon detector's sensitivity.

SUMMARY OF THE INVENTION

It is an object of the invention to provide a gamma radiation detection device with improved sensitivity.

This object is achieved by a gamma radiation detection device comprising a scintillator element and an optical detector. The optical detector is in optical communication with the scintillator element, and a plurality of particles or voids are dispersed in the scintillator element. Optical scattering introduced by the particles or voids improves the proportion of scintillation light detected by the optical detector, thereby improving the sensitivity of the gamma radiation detection device.

The inventors have found that the sensitivity of gamma radiation detection devices is restricted by the trapping of scintillation light within the lossy scintillator element. Scintillation light is trapped by multiple reflections within the scintillator element where it is consequently absorbed, preventing its detection by the associated optical detector. Such scintillator elements are conventionally surrounded by an air medium. Total internal reflection at the scintillator element-to-air interfaces of the high refractive index scintillator element is used to retain obliquely-incident scintillation light within the scintillator element. However such specular reflections can lead to long optical paths within the scintillator element and consequently significant absorption therein. Optical photons which perform a straight-edged spiral trajectory within the scintillator element are particularly affected by such absorption. In another configuration, inwardly-reflecting layers are applied to the surfaces of the scintillator element and an air gap is disposed between the inwardly-reflecting layer and the surface of the scintillator element. The air gap again serves to retain light that is incident at oblique incidence angles by total internal reflection, and the inwardly-reflecting layers serve to retain light that is at near-normal incidence to the scintillator surfaces. The inwardly-reflecting layers greatly improve the proportion of light retained in the scintillator element, however a significant loss occurs within the scintillator element for optical paths having near-normal incidence to the scintillator element's surfaces. Such near-normal incident light may also become trapped by multiple reflections in the optical cavity formed by the air gaps and the scintillator element between the reflecting layers where again the resulting long path lengths lead to significant absorption. Optical photons trapped by these processes have been simulated to undergo absorption following hundreds or thousands of reflections.

In the present invention the optical scattering deliberately introduced by the particles or voids acts to prevent such multiple reflections from occurring. Such particles or voids would normally be deliberately excluded from a scintillator element because optical scatter is conventionally considered to impede the propagation of scintillation light and is therefore preferably avoided. Even in the absence of any additional reflecting layers, the scattering introduced by the particles or voids randomly alters the direction of travel of the scintillation light, preventing such losses from building up through multiple reflections in the scintillator element. In the presence of additional reflecting layers, even greater benefits are observed.

Particles that are deliberately dispersed in the scintillator element in accordance with the invention differ from dopants which may be present in the scintillator material in that a dopant is introduced into the host matrix of the scintillator on an atomic level and consequently occupies a lattice site. The introduced particles by contrast occupy macroscopic spaces in the scintillator element. Voids are conventionally intentionally removed from scintillator elements by sintering.

In accordance with one aspect of the invention the ratio of the scatter coefficient to the absorption coefficient in the scintillator element is in the range 0.5 to 1000. Such a range leads to an improvement in the sensitivity of the gamma radiation detection device.

In accordance with another aspect of the invention the particles or voids are dimensioned so as to efficiently scatter scintillation light travelling within the scintillator element. Effective scattering is provided by particles or void sizes having a dimension that is small compared to, or comparable to the wavelength of the scintillation light. Conventionally, scintillator elements have a characteristic emission spectrum close to the visible wavelength region and consequently useful scattering is observed for particles or voids having an average diameter in the range 50 nanometers to 1000 nanometers. By further narrowing the range to 100 nanometers to 500 nanometers even more effective scattering is observed and consequently the optical detector's scintillation light capture efficiency is even further improved.

In accordance with another aspect of the invention the scintillator element has a characteristic optical emission spectrum and the ratio of the refractive index of the scintillator element to the refractive index of the particles or voids exceeds 1.2 at a wavelength within the optical emission spectrum of the scintillator element. Such a refractive index ratio provides useful scattering of the scintillation light, and improved scattering is obtained when this ratio is increased. In accordance with another aspect of the invention the particles are at least one of the following: $Al_2O_3$ particles, $SiO_2$ particles, $MgO_2$ particles. Such particles may be readily incorporated in scintillator materials and advantageously lead to useful scattering. The use of a combination of such particles is also envisaged.

In accordance with another aspect of the invention the voids are filled with one of the following: a gas, air, a fluid. Alternatively the voids may be completely empty and thus evacuated. The filling of the voids in this way may advantageously be used to modify their refractive index and thereby improve the scattering.

In accordance with another aspect of the invention the optical detector is in optical communication with the scintillator element by means of a detector optical interface and the gamma radiation detection device further comprises at least one reflecting layer. The at least one reflecting layer is in optical communication by means of an air gap with at least a portion of at least one surface of the scintillator element other than the detector optical interface. Whilst the particles or voids in the scintillator element have a beneficial effect in a gamma radiation detector in the absence of such a reflecting layer; light being guided by total internal reflection within the high refractive index scintillator element; the addition of the at least one reflecting layer with an air gap disposed between the reflecting layer and the surface of the scintillator element improves the reflectance of near-normally incident scintillation light in particular. The reflecting layer acts to return some of the near-normally incident light to the scintillator element, thereby improving the optical detector's scintillation light capture efficiency. Furthermore, the probability of light escaping to nearby scintillation elements is also reduced. This reduces the risk of the scintillation light cross-coupling to a nearby scintillator element where its detection risks misinterpretation as to its source. The reduction in cross-coupling of scintillation light is particularly beneficial in for example a PET imaging system in which it both improves the spatial resolution of the resulting image and the signal to noise ratio. The reflecting layer may be a specular reflecting layer or a diffuse reflecting layer or a plurality of such layers disposed side by side on a surface. Both types of reflecting layers operate to return some of the incident light to the scintillator element. The air gap preferably has a thickness exceeding 100 nanometers and is disposed between the at least one reflecting layer and a surface of the scintillator element. The air gap advantageously improves the reflectance of scintillation light at oblique incidence angles and thereby improves its retention within the scintillator element and consequently improves the sensitivity of the gamma radiation detector. The at least one reflecting layer may be formed as a film, for example through deposition of reflecting materials such as metals on a polymer carrier layer, and may further be applied by means of wrapping around the scintillator element. Such a wrapping process inherently provides a suitable air gap between the reflecting layer and the surface of the scintillator element.

The at least one reflecting layer may be for example a metal layer, PTFE, Teflon, Lumirror®, Enhanced Specular Reflector (ESR) film, Tyvek® or TiO. Suitable metals include silver and aluminium, and the metal may be disposed on a polymer film in order to permit its wrapping around the scintillator element. These materials have an inherently high reflectivity at the typically visible wavelengths of scintillation light produced by the scintillator element. The sensitivity of the radiation detector may be further optimized by improving the reflectivity of these materials in this spectral region. The range of scintillation light wavelengths contemplated by this aspect of the invention extends from the UV to the far infrared. Clearly the reflecting layer should not be located at the interface with the optical detector. Advantageously the detector optical interface may include an antireflection layer having low reflectance at the scintillation light wavelengths in order to improve the transmission of scintillation light between the scintillator element and the optical detector.

In accordance with another aspect of the invention the at least one reflecting layer comprises a first diffuse reflecting layer and a second specular reflecting layer; wherein the first diffuse reflecting layer is more proximal to the scintillator element than the second specular reflecting layer. Such a construction initially provides diffuse reflection for scintillation light that traverses the air gap, and subsequently specular reflection for scintillation light transmitted by the first diffuse reflecting layer. Advantageously the first diffuse reflecting layer increases the scattering in the scintillator element, thereby improving the sensitivity of the gamma photon detector in the same manner as that described for the scattering by particles or voids dispersed in the scintillator element. The second specular reflecting layer further improves the sensitivity by returning some of the transmitted light to the scintillator element, and also reduces the cross-coupling of scintillation light to neighboring scintillator elements.

The first and second reflecting layers may exemplarily be applied by means of wrapping a layer around the scintillator element. Such a process inherently provides a suitable air gap between the surface of the scintillator element and the combination of the first and second layers. The layers may be formed as a film, for example through the successive deposition of the two layers on a polymer carrier, or the layers may be formed separately and wrapped in succession.

In accordance with another aspect of the invention the scintillator element has a ceramic structure. Advantageously a wide range of both materials for and sizes of scattering particles and voids may be incorporated into such a ceramic structure. Suitable ceramic scintillator materials include for example garnets, oxysulfides or other oxydic scintillator materials. The oxysulfide may for example be a rare earth oxysulfide. Suitable scattering particles for use in ceramic scintillator elements include $Al_2O_3$, $SiO_2$ and $MgO_2$. An example technique for incorporating scattering particles of $Al_2O_3$ into ceramics is disclosed in WO2006097876 in relation to Light Emitting Diodes (LEDs) in which $Al_2O_3$ is incorporated as a second phase into a garnet phase when the two are in thermodynamic equilibrium in order to increase optical scattering.

In accordance with another aspect of the invention the scintillator element has a porous ceramic structure. The pores in the ceramic structure can be advantageously used to provide the voids for scattering the scintillation light. An example technique for incorporating pores into ceramic material is described in patent application WO2009090580A1 which relates to LEDs. WO2009090580A1 discloses the incorporation of pores in ceramic material by the inclusion of suitably sized polymeric particles, such as polystyrene or polyacrylate, at the slurry stage in the formation of a ceramic. Upon sintering, the polymeric particles are removed, leaving a porous structure with the desired pore size.

In accordance with another aspect of the invention the optical detector in the gamma radiation detection device is either a photomultiplier tube (PMT) detector or a solid state semiconductor optical detector. A PMT detector has a fast response time which makes them suitable for the detection of the scintillation light resulting from radiation events with high sensitivity. A solid state semiconductor optical detector, defined herein as an optical detector produced using monolithic processes in semiconductor materials, has both a fast response time and can be made in smaller dimensions than a PMT. Consequently a solid state semiconductor optical detector can be used to produce a smaller gamma radiation detection device. Suitable semiconductor detectors include for example photodiodes, avalanche photodiodes, silicon photomultipliers (SiPM) and single photon avalanche diodes (SPADs).

In accordance with another aspect of the invention a method for the manufacture of a scintillator element for use in a gamma radiation detection device comprises the steps of: providing a slurry comprising a ceramic material and polymeric inclusions; forming a ceramic body from the slurry; and removing the polymeric inclusions from the ceramic body by subjecting the ceramic body to a thermal treatment to provide a porous scintillator element with voids dispersed therein. Such a method provides a controllable void size and consequently controllable scattering in the scintillator element.

In accordance with another aspect of the invention, a PET or SPECT imaging system having an imaging region comprises a plurality of gamma radiation detection devices. The plurality of gamma radiation detection devices are disposed about the imaging region and configured to receive radiation quanta from the imaging region. In a PET imaging system the gamma radiation detection devices are so configured by disposing them radially about the imaging region. In a SPECT imaging system the gamma radiation detection devices are so configured by arranging them as a planar array with a gamma photon receiving surface facing the imaging region. The use of the radiation detection devices advantageously improves the imaging system image quality by virtue of their improved signal to noise ratio. In such a PET imaging system, electrical signals generated by the radiation detection devices may be further processed in order to identify coincident pairs of radiation quanta received within a predetermined time interval of each other. Further data processing may be used to reconstruct the coincident pairs into an image indicative of the distribution of the radiation source in the imaging region. In SPECT imaging the electrical signals generated by the radiation detection devices may be further processed in order to reconstruct such an image based on the trajectory of the received gamma photons.

In accordance with another aspect of the invention a method of detecting gamma photons is disclosed. The method comprises the steps of receiving at least one gamma photon with the gamma radiation detection device and generating an electrical output from the optical detector in response to the reception of the at least one gamma photon.

Other method steps disclosed in accordance with the invention may further be included within the method.

DETAILED DESCRIPTION OF THE INVENTION

In order to provide a gamma radiation detection device with improved sensitivity a scintillator element in optical communication with an optical detector is provided. A plurality of particles or voids are dispersed in the scintillator element. As described above, the sensitivity of the gamma radiation detection device is improved by the particles or voids which scatter scintillation light within the scintillator element. The scattering reduces the opportunity for light to undergo multiple reflections within the lossy scintillator element which would otherwise degrade the optical detector's scintillation light capture efficiency.

The gamma radiation detection device is now described with reference to an exemplary application of PET imaging. It is however to be understood that the gamma radiation detection device is not restricted to this example and finds application in other types of gamma radiation detection systems including a SPECT imaging system.

Figure 1:
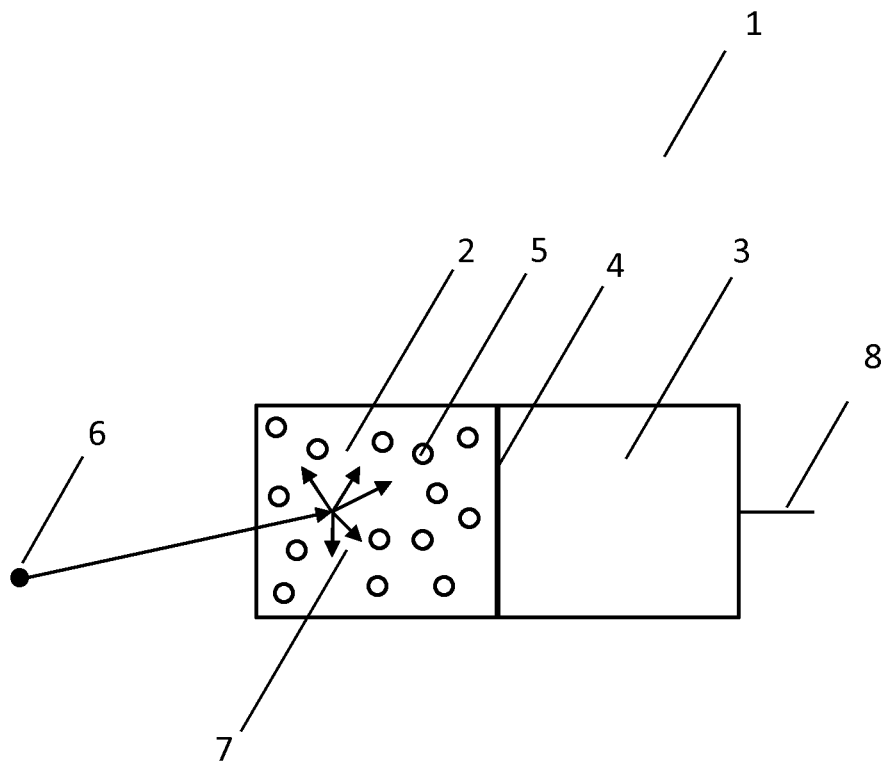
FIG. 1 illustrates an exemplary gamma radiation detection device in accordance with certain aspects of the invention.

FIG. 1 illustrates an exemplary gamma radiation detection device in accordance with certain aspects of the invention. In a first embodiment of the invention illustrated in FIG. 1, gamma radiation detection device 1 comprises scintillator element 2 in optical communication with optical detector 3 by means of detector optical interface 4. A plurality of particles or voids 5 are dispersed in the scintillator element 2.

In operation, the capture of radiation quant 6, such as a gamma photon, by scintillator element 2 results in the generation of scintillation light 7 comprising a plurality of optical photons having wavelengths within a characteristic optical emission spectrum of scintillator element 2. Typically the energies of the optical photons are much smaller than that of the captured radiation quant 6 and thus the scintillation light may comprise wavelengths from the UV through the visible to the infrared region. In typical scintillator materials the peak of the characteristic optical emission spectrum of scintillator element 2 is in the visible wavelength region.

Total internal reflection occurs within a medium when it has an interface with another medium having a lower refractive index and when the incidence angle exceeds a critical angle. Typical scintillator elements have a high refractive index. LYSO, for example has a refractive index of 1.82 at the near-green peak of its optical emission spectrum, and when surrounded by an air medium with a refractive index of unity, has a critical angle of 33 degrees.

Returning to FIG. 1, scintillation light 7 incident at the surfaces of scintillator element 2 with a larger incidence angle than the critical angle therefore undergoes total internal reflection. In typical scintillator elements such as LYSO the small critical angle is sufficient to retain a proportion of the scintillation light until it is detected by optical detector 3. Thus scintillation light 7 generated within scintillator element 2 as a result of the capture of radiation quant 6 undergoes a combination of scattering by particles or voids 5, and total internal reflection by the surfaces of scintillator element 2 other than detector optical interface 4 until it is captured by optical detector 3, where it results in an electrical signal at optical detector output 8 indicative of the capture of radiation quant 6. Advantageously detector optical interface 4 may include an antireflection layer having a low reflectance at wavelengths within the characteristic optical emission spectrum of scintillator element 2 in order to improve the transmission of scintillation light between the scintillator element and the optical detector and thereby further improve the optical detector's scintillation light capture efficiency. The electrical signal at optical detector output 8 may subsequently be processed by electronic circuitry. Radiation quant 6 may be for example a gamma photon, and may be one of a pair of oppositely-directed gamma photons formed as a consequence of a positron annihilation event following radioactive decay. The source of the radioactive decay may for example be a radiotracer.

Scintillator elements such as scintillator element 2 illustrated in FIG. 1 are typically formed from either crystalline materials, such as LYSO, $LaBr_3$, GSO and BGO or more recently ceramic materials such as garnets have been proposed for such use.

In a preferred embodiment the scintillator element is a ceramic material owing to the relative ease of incorporating particles or voids. When ceramic structures are used, various methods may be used to disperse the particles or voids in the scintillator element. When particles are used, suitable particle materials include for example $Al_2O_3$, $SiO_2$ or $MgO_2$ particles. Patent application WO2006/097876A1 which relates to Light Emitting Diodes (LEDs) describes a suitable method for incorporating $Al_2O_3$ particles into a ceramic garnet in which an $Al_2O_3$ second phase which is in thermodynamic equilibrium with the garnet phase can be used to increase scatter. Particles may be introduced into a scintillator element for use in gamma radiation detection by the steps of providing a slurry comprising a ceramic material and alumina particles; forming a ceramic body from the slurry using methods such as pressing, slip casting, tape casting, roller pressing, extrusion or injection moulding; and by applying a thermal treatment, optionally in combination with hot isostatic pressing. When voids are used, the porosity of ceramic structures can be controlled by adding templates to the green material as described in patent application WO2009090580A1 which relates to LEDs. WO2009090580A1 discloses the incorporation of pores into ceramic materials by the addition of suitably sized polymeric inclusions at the slurry stage in the formation of a ceramic. Upon sintering, the polymeric inclusions are removed, leaving a porous structure with the desired pore size. A porous scintillator element for use in the detection of gamma radiation may be fabricated by providing a slurry comprising a ceramic material and polymeric inclusions. The polymeric inclusions may for example be polystyrene or polyacrylate and have a diameter in the range of the desired voids. A ceramic body is then formed from the slurry.

Methods such as pressing, slip casting, tape casting, roller pressing, extrusion or injection moulding may be used to form the ceramic body. Subsequently the polymeric inclusions are removed from the ceramic body to provide a porous ceramic element. The inclusions are removed by subjecting the ceramic body to a thermal treatment. The polymeric inclusions are removed by decomposition or oxidation as a result of the thermal treatment, hence they essentially disappear from the ceramic body leaving voids in their place. Typically the thermal treatment is performed at a temperature up to 1000° C., and preferably at a temperature up to 500° C. dependent upon the decomposition or oxidation temperature of the polymer used. A further thermal treatment stage may also be performed at a temperature above 1000° C., for example at up to 1700° C. in order to densify the porous ceramic. It is noted that the voids may in general subsequently be fluid-filled, gas-filled, air-filled, or completely empty wherein the voids have any gas drawn out under vacuum.

When scintillator elements having a crystalline structure are used, voids may be dispersed in the scintillator element by for example the generation of laser-induced damage.

Desirably the particles or voids are dimensioned so as to efficiently scatter scintillation light travelling within the scintillator element. In a preferred embodiment this is achieved by arranging that the average diameter of the particles or voids is in the range 50 nanometers to 1000 nanometers. By further narrowing the range to 100 nanometers to 500 nanometers even more effective scattering is observed and consequently the optical detector's scintillation light capture efficiency is even further improved.

The term "diameter" used in relation to the particles and voids in the present invention is to be interpreted as synonymous with the commonly accepted term "volume diameter"; whose definition as "the diameter of a sphere having the same volume as the particle" may be found in textbooks such as the Handbook of Fluidization and Fluid-Particle Systems, CRC Press 2003, Ed. YANG, Wen-Ching, ISBN: 0-8247-0259-X. Thus, the particles or voids are to be interpreted as having a shape that may differ from that of a perfect sphere, as would be expected from either the $Al_2O_3$, $SiO_2$ or $MgO_2$ particles described above, or as a result of using the polymeric inclusions in the fabrication process described above.

The ratio of the refractive index of the scintillator element 2 to that of the particles or voids 5 at a wavelength within the optical emission spectrum of the scintillator element may also be used to control the strength of the scattering of scintillation light. Any ratio exceeding unity will provide some useful scattering, and particles or voids 5 inherently have a refractive index that is different to that of scintillator element 2. In a preferred embodiment the ratio of the refractive index of the scintillator element to the refractive index of the particles or voids exceeds 1.2 at a wavelength within the optical emission spectrum of the scintillator element. Such a refractive index ratio provides enhanced scattering of the scintillation light, and even further enhanced scattering is obtained when this ratio is further increased. In one example the particles are $SiO_2$ particles with a refractive index of 1.45 and the scintillator element is LYSO with a refractive index of 1.82 which results in an above ratio of approximately 1.2. In another example the voids are air-filled voids with a refractive index of unity and the scintillator element is LYSO with a refractive index of 1.82 which results in an above ratio of 1.82. Higher ratios are also achievable by for example using a scintillator element with a higher refractive index. Lower ratios may likewise be achieved. The wavelength at which the refractive index is defined may be any wavelength within the optical emission spectrum, such as for example the wavelength of the peak of the optical emission spectrum of the scintillator element.

Whilst the invention is not limited to the disclosed example refractive indices, it is generally noted that small values of the above ratio lead to less effective scattering, and that scattering is improved by making the ratio as large as possible. The refractive index may also be controlled by filing the pores or voids with a fluid having a particular refractive index. In one example, the voids are filled with air having a refractive index of approximately unity. In this way scattering in scintillator element 2 may be further controlled in order to improve the optical detector's scintillation light capture efficiency.

Figure 2:
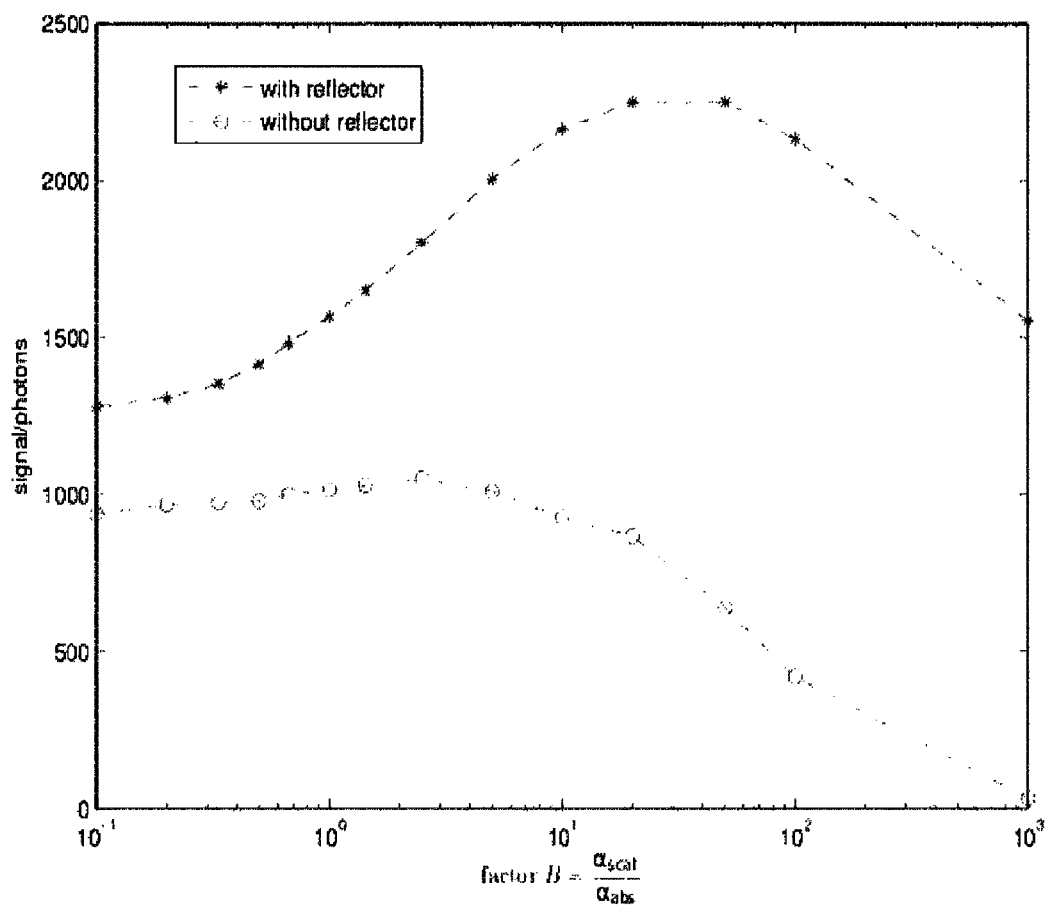
FIG. 2 illustrates a Monte-Carlo simulation of the signal captured by an optical detector from a scintillator element as a function of the ratio of the scatter coefficient to absorption coefficient in the scintillator element, denoted factor B.

In order to demonstrate the benefit of the invention, FIG. 2 illustrates a Monte-Carlo simulation of the signal captured by an optical detector from a scintillator element as a function of the ratio of the scatter coefficient to absorption coefficient in the scintillator element, denoted factor B. The lower curve illustrates the operation according to the first embodiment of the invention illustrated in FIG. 1 in which no additional reflectors are used on the scintillator element. The upper curve illustrates the operation according to a second embodiment of the invention illustrated in FIG. 3 in which an additional reflector layer is applied to the scintillator element.

The captured signal plotted on the vertical axis of FIG. 2 initially increases gradually from a baseline level as the ratio of scatter coefficient to absorption coefficient is increased. In the absence of a reflector, thus for the lower curve, a more pronounced benefit is seen when this ratio exceeds approximately 0.5, and when the ratio exceeds approximately 10 the captured signal falls below its initial baseline value. In the presence of a reflector, thus for the upper curve, the captured signal initially increases and starts to decrease when the ratio of scatter coefficient to absorption coefficient exceeds approximately 50, subsequently falling below its initial reference value beyond the maximum plotted range of 1000. In general for both curves the optical detector's scintillation light capture efficiency is acceptable when the ratio of scatter coefficient to absorption coefficient is in the range 0.5 to 1000. In general for both curves the optical detector's scintillation light capture efficiency is highest when the ratio of scatter coefficient to absorption coefficient is in the range 1 to 100. In the presence of a reflector, the highest optical detector scintillation light capture efficiency is achieved when the ratio is in the range 10 to 100.

Factor B plotted along the horizontal axis of FIG. 2, thus the ratio of scatter coefficient to absorption coefficient in the scintillator element, can be quantified according to the following procedure. The absorption coefficient is determined by a transmission measurement for a scintillator element at a wavelength within the scintillation light emission spectrum. The measured transmission (T), corrected for reflection at the entrance and exit side of the optical path, is determined by an exponential decay law governed by the product of the absorption coefficient ($\alpha_{abs}$) and the length (L) of the scintillator element and is represented by Equation 1 below. It is noted that the units of the absorption coefficient ($\alpha_{abs}$) and the length (L) are typically $cm^{-1}$ and cm respectively.

$$T = e^{-\alpha_{abs} \cdot L} \qquad \text{Equation 1}$$

The scatter coefficient is defined herein as the product of the volume concentration of scattering particles or voids and the cross sectional area of a particle or void as an average for all particles or voids. As an example, spherical voids having an average diameter of 50 nanometers each have an average cross sectional area of 1963 nm$^2$, thus approximately 2000 nm$^2$. A volume concentration of $10^{10}$ such voids per cm$^3$ results in a scatter coefficient of 0.2 cm$^{-1}$ which is determined by calculating the product of these two numbers. The ratio of scatter coefficient to absorption coefficient defined above has no units; and can thus be computed when both the absorption coefficient and the scatter coefficient are measured in the same units, such as cm$^{-1}$. Voids with a diameter of 200 nanometers and the same volume concentration would have a scattering coefficient of 3.2 cm$^{-1}$, and so on.

According to a second embodiment of the invention the optical detector is in optical communication with the scintillator element by means of a detector optical interface and the gamma radiation detection device further comprises at least one reflecting layer. The at least one reflecting layer is in optical communication by means of an air gap with at least a portion of at least one surface of the scintillator element other than the detector optical interface. The reflecting layer is an inwardly-reflecting layer which operates so as to return some of the light that is incident on the surfaces of the scintillator element, specifically the surfaces other than the detector optical interface, back into the scintillator element. It is noted that the reflecting layer may be either a specular reflecting layer or a diffuse reflecting layer.

Figure 3:
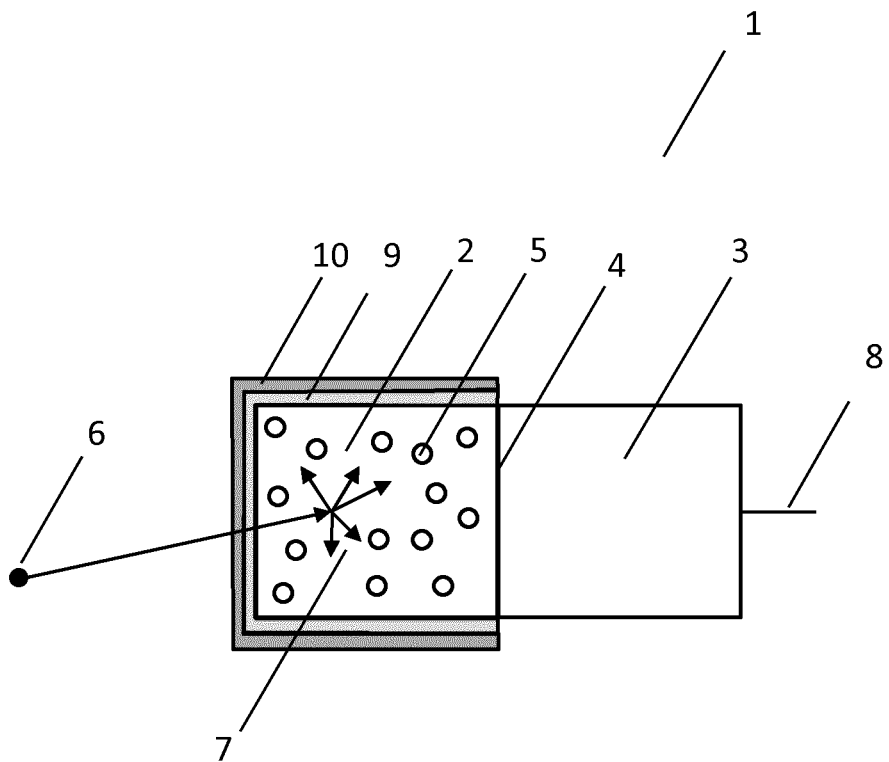
FIG. 3 illustrates an exemplary gamma radiation detection device in accordance with an embodiment of the invention which includes a reflecting layer and an air gap.

FIG. 3 illustrates an exemplary gamma radiation detection device in accordance with an embodiment of the invention which includes a reflecting layer and an air gap. In FIG. 3, reflecting layer 10 is in optical communication with all surfaces of scintillator element 2 other than detector optical interface 4 by means of an air gap 9. Whilst reflecting layer 10 is illustrated as covering all surfaces of scintillator element 2 other than detector optical interface 4, this need not be the case since some benefit in improved sensitivity will be achieved by covering a portion of one or more surfaces of scintillator element 2 in this way. The covering of all such surfaces is however preferable in order to improve the optical detector's scintillation light capture efficiency. As described above, reflecting layer 10 may be a specular reflecting layer or a diffuse reflecting layer since both operate so as to return some of the incident light back into scintillator element 2. Suitable materials for the reflecting layer include for example: metals, PTFE, Teflon, Lumirror®, ESR film, Tyvek®, TiO. Suitable methods for applying such layers are known to those skilled in the art and include the wrapping of a film comprising such a reflective layer around the scintillator element. The air gap preferably has a thickness exceeding 100 nanometers and is disposed between reflecting layer 10 and at least a portion of at least one surface of scintillator element 2.

In operation, scintillation light 7 generated within scintillator element 2 undergoes a combination of scattering and total internal reflection until it reaches optical detector 3 where it is detected as an electrical signal at optical detector output 8. Scintillation light 7 reaching a surface having air gap 9 will undergo total internal reflection if its incidence angle exceeds the critical angle. If its incidence angle does not exceed the critical angle then it will be transmitted by air gap 9 until it reaches reflecting layer 10. Such light reaching reflecting layer 10 is reflected such that some of the light is redirected back into scintillator element 2. When within scintillator element 2, scintillation light 7 may undergo these processes several times until it is detected by optical detector 3. By reducing the trapping of light in lossy regions where multiple reflections occur, the optical detector's scintillation light capture efficiency is improved, thereby improving the sensitivity of the gamma radiation detection device 1.

Figure 4:
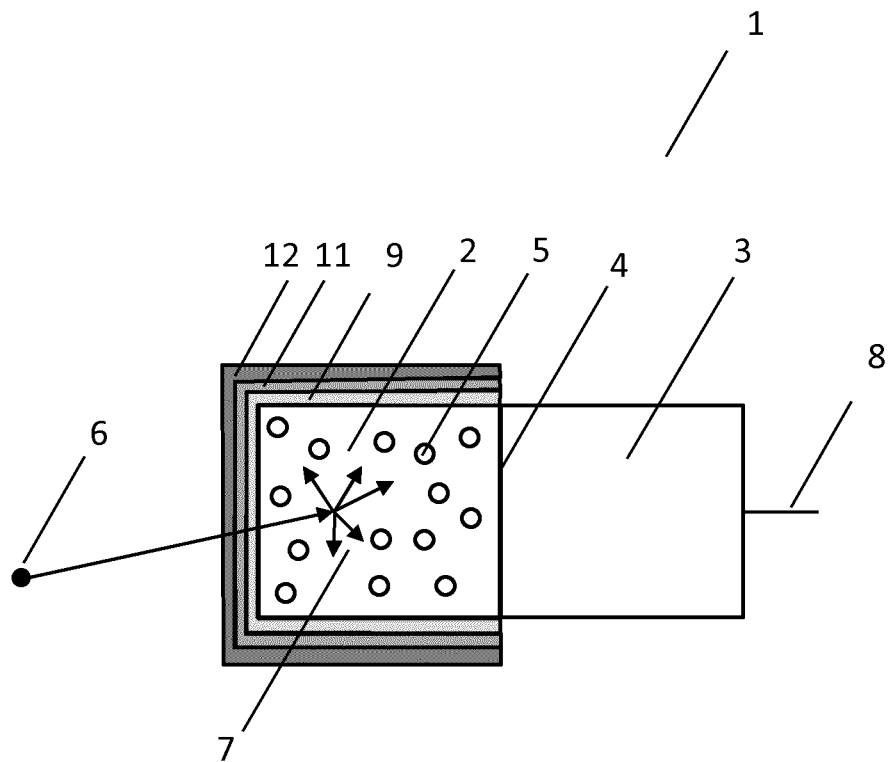
FIG. 4 illustrates an exemplary gamma radiation detection device in accordance with an embodiment of the invention which includes a first diffuse reflecting layer and a second specular reflecting layer and an air gap.

FIG. 4 illustrates an exemplary gamma radiation detection device in accordance with an embodiment of the invention which includes a first diffuse reflecting layer and a second specular reflecting layer and an air gap. In accordance with this third embodiment of the invention the first diffuse reflecting layer 11 is more proximal to scintillator element 2 than second specular reflecting layer 12. In FIG. 4 reflecting layers 11 and 12 are illustrated as being in optical communication with all surfaces of scintillator element 2 other than detector optical interface 4 by means of an air gap 9. As with the second embodiment, whilst the reflecting layer 10 is illustrated as covering on all surfaces of scintillator element 2 other than detector optical interface 4, this is preferably the case but is not essential since some benefit will be achieved by covering a portion of one or more surfaces of scintillator element 2 in this way.

In operation, scintillation light 7 generated within scintillator element 2 in FIG. 4 undergoes a combination of scattering and total internal reflection until it reaches optical detector 3 where it is detected as an electrical signal at optical detector output 8. Scintillation light 7 reaching a surface having air gap 9 will undergo total internal reflection if its incidence angle exceeds the critical angle. If its incidence angle does not exceed the critical angle then it is transmitted by the air gap until it reaches first diffuse reflecting layer 11. Such light reaching first diffuse reflecting layer 11 is scattered such that much of the light is redirected back into scintillator element 2. A proportion of the light transmitted by first diffuse reflecting layer 11 is transmitted to second specular reflecting layer 12 where it undergoes specular reflection and is returned back through first diffuse reflecting layer 11 to scintillator element 2. When within scintillator element 2, scintillation light 7 may undergo these processes several times until it is detected by optical detector 3. By reducing the trapping of light in lossy regions where multiple reflections occur, the optical detector's scintillation light capture efficiency is improved, thereby improving the sensitivity of gamma radiation detection device 1.

Suitable layer materials for the first diffuse reflecting layer 11 include for example TiO, PTFE and Teflon. Suitable layer materials for the second specular reflecting layer 12 include for example metals, Lumirror®, ESR film and Tyvek®.

Figure 5:
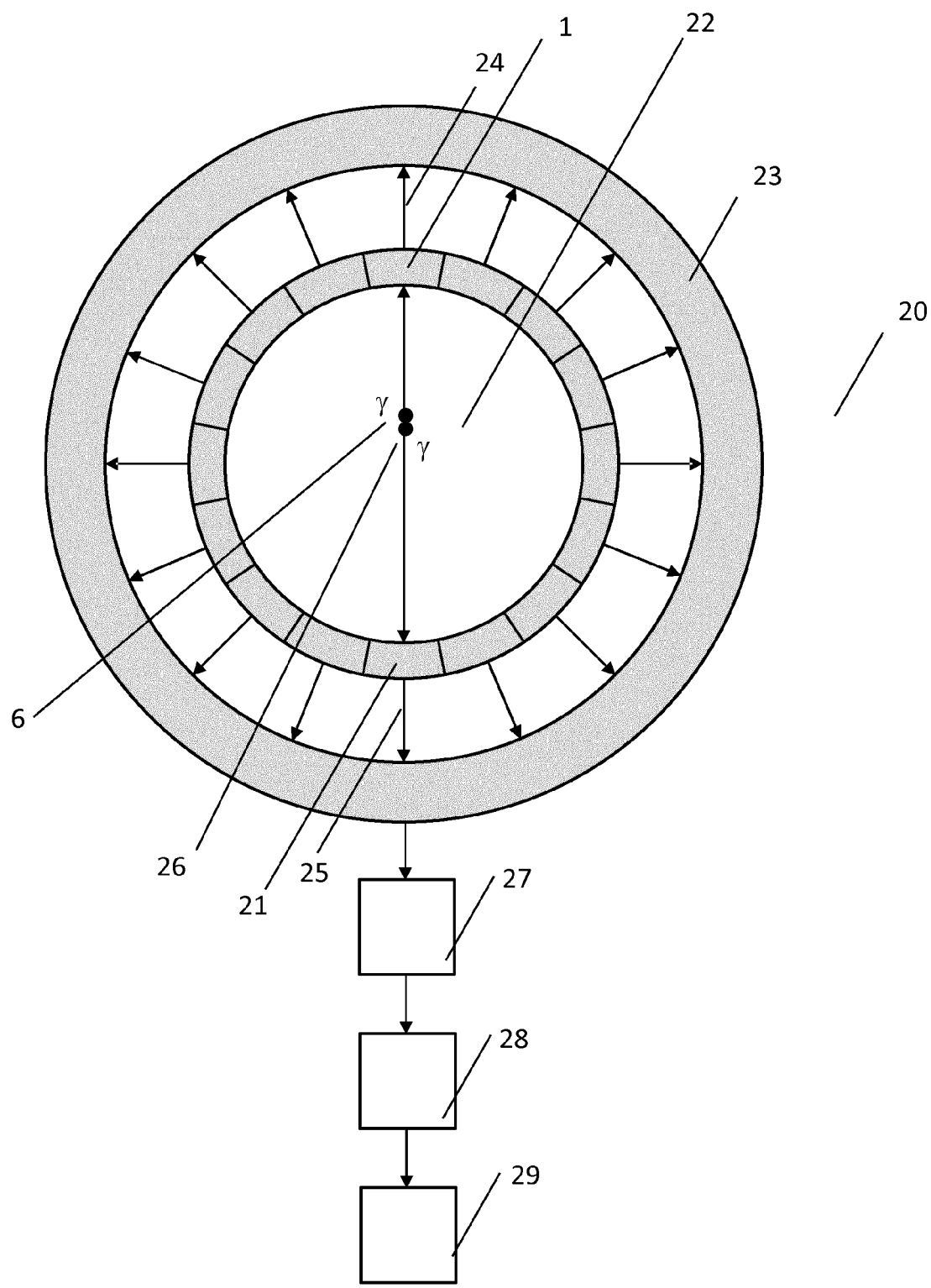
FIG. 5 illustrates an exemplary PET imaging system in accordance with certain aspects of the invention.

FIG. 5 illustrates an exemplary PET imaging system in accordance with certain aspects of the invention. The exemplary gamma radiation detection device 1 of FIG. 1, or that of FIG. 3, or that of FIG. 4 may for example be used in the system illustrated in FIG. 5. In FIG. 5, PET imaging system 20 comprises a plurality of gamma radiation detection devices 1, 21 disposed radially about imaging region 22 in order to receive gamma radiation, otherwise known as gamma photons, from imaging region 22. The plurality of gamma radiation detection devices each produce electrical signals indicative of the capture of gamma photons, and the electrical signals are received by coincidence determination unit 23 by means of bus 24, 25. The gamma photons may be a pair of oppositely-directed gamma photons 6, 26 formed as a consequence of an annihilation event following radioactive decay wherein the radioactive decay produces a positron that is annihilated by an electron. Coincidence determination unit 23 assesses the time of capture of each of the gamma photons represented by the electrical pulses and sorts the gamma photons into pairs of coincident events captured within a narrow time interval of each other. The time interval is typically +/−5 ns in PET. The coincidence determination unit may further analyze the energy associated with each captured gamma photon and deem two gamma photons as coincident if they both occur within a narrow time interval as well as have energies within a narrow energy window, typically within +/−10% of the peak gamma photon energy. Coincidence determination unit 23 is in communication with reconstruction processor 27 which constructs a line of response for each pair of captured gamma photons deemed coincident and further processes multiple such lines of response in order to reconstruct data representative of an image of the originating positions of the captured gamma photons deemed coincident by coincidence determination unit 23. Reconstruction processor 27 may use techniques such as iterative reconstruction and filtered backprojection. Reconstruction processor 27 is in further communication with image processing unit 28 which is configured to process the data representing the originating positions of the coincident gamma photons into a format suitable for presenting an image on an output device. Image processing unit 28 is in further communication with an output device 29 for presenting the image, such as a display, a printer and the like.

When in use, a portion of a subject to be imaged, such as portion of a human or animal body is positioned in imaging region 22 of the exemplary PET imaging system in FIG. 5. The portion may be a region or an organ within the subject in which it is desired to measure the uptake of a radiotracer. Prior to the positioning of the portion in imaging region 22, a radiotracer may be administered to the subject, and an uptake period may be permitted to lapse prior to the commencement of imaging. During the imaging process the plurality of gamma radiation detection devices 1, 21 capture gamma photons resulting from radioactive decay events within imaging region 22, such as from the decay of a radiotracer administered to a subject. Following the imaging process the PET imaging system produces an image indicative of the distribution of the radiotracer within the portion of the subject.

To summarize, a gamma radiation detection device comprising a scintillator element and an optical detector has been described with reference to a PET imaging system. The gamma radiation detection device also finds application in a SPECT imaging system. A plurality of particles or voids dispersed in the scintillator element scatter scintillation light in order to reduce the trapping of light by multiple reflections in the scintillator element, thereby improving the sensitivity of the radiation detection device.

Whilst the invention has been illustrated and described in detail in the drawings and foregoing description, such illustrations and description are to be considered illustrative or exemplary and not restrictive; the invention is not limited to the disclosed embodiments and can be used in the detection of gamma radiation in various gamma radiation detection systems.

The invention claimed is:

1. A gamma radiation detection device comprising:
a scintillator element having a ceramic structure;
an optical detector in optical communication with the scintillator element;
a plurality of particles or voids dispersed in macroscopic non-lattice spaces in the scintillator element wherein the average volume diameter of the particles or voids in the range 50 nanometers to 1000 nanometers.

2. The gamma radiation detection device according to claim 1 wherein the ratio of the scatter coefficient to the absorption coefficient in the scintillator element is in the range 0.5 to 1000.

3. The gamma radiation detection device according to claim 1 wherein the scintillator element has a characteristic optical emission spectrum and the ratio of the refractive index of the scintillator element to the refractive index of the particles or voids exceeds 1.2 at a wavelength within the optical emission spectrum of the scintillator element.

4. The gamma radiation detection device according to claim 1 wherein the particles are at least one of the following: $Al_2O_3$ particles, $SiO_2$ particles, $MgO_2$ particles.

5. The gamma radiation detection device according to claim 1 wherein the voids are filled with one of the following: a vacuum, a gas, air, a fluid.

6. The gamma radiation detection device according to claim 1 wherein the scintillator element has a porous ceramic structure.

7. The gamma radiation detection device according to claim 6 wherein the scintillator element is formed from at least one of the following material groups: garnets, oxysulfides, oxydic materials.

8. The gamma radiation detection device according to claim 7 wherein the optical detector is either a photomultiplier tube (PMT) detector or a solid state semiconductor optical detector.

9. A PET or SPECT imaging system having an imaging region and comprising a plurality of gamma radiation detection devices according to claim 1; wherein the plurality of gamma radiation detection devices are disposed about the imaging region and configured to receive radiation quanta from the imaging region.

10. A method of detecting gamma photons; the method comprising the steps of:
receiving at least one gamma photon with the gamma radiation detection device according to claim 1; and
generating an electrical output from the optical detector in response to the reception of the at least one gamma photon.

11. The method according to claim 1, wherein the particles or voids have a diameter in the range of 100-500 nanometers.

12. The method according to claim 1, wherein the scintillator element emits light of a characteristic wavelength and the particles or voids have a diameter smaller than the characteristic wavelength.

13. A gamma radiation detection device comprising:
a scintillator element having a ceramic structure;
an optical detector in optical communication with the scintillator element;
a plurality of particles or voids dispersed in the scintillator element wherein the average volume diameter of the particles or voids is in the range 50 nanometers to 1000 nanometers;
wherein the optical detector is in optical communication with the scintillator element by means of a detector optical interface; the gamma radiation detection device further comprising at least one reflecting layer;
wherein the at least one reflecting layer is in optical communication by means of an air gap with at least a portion of at least one surface of the scintillator element other than the detector optical interface.

14. The gamma radiation detection device according to claim 13 wherein the at least one reflecting layer comprises a first diffuse reflecting layer and a second specular reflecting layer;
wherein the first diffuse reflecting layer is more proximal to the scintillator element than the second specular reflecting layer.

15. A method for the manufacture of the scintillator element of claim 5 for use in a gamma radiation detection device; the scintillator element having a plurality of voids dispersed in the scintillator element; the method comprising the steps of:
- providing a slurry comprising a ceramic material and polymeric inclusions;
- forming a ceramic body from the slurry; and
- removing the polymeric inclusions from the ceramic body by subjecting the ceramic body to a thermal treatment to provide a porous scintillator element with voids dispersed in macroscopic non-lattice spaces therein.

* * * * *